UNITED STATES PATENT OFFICE.

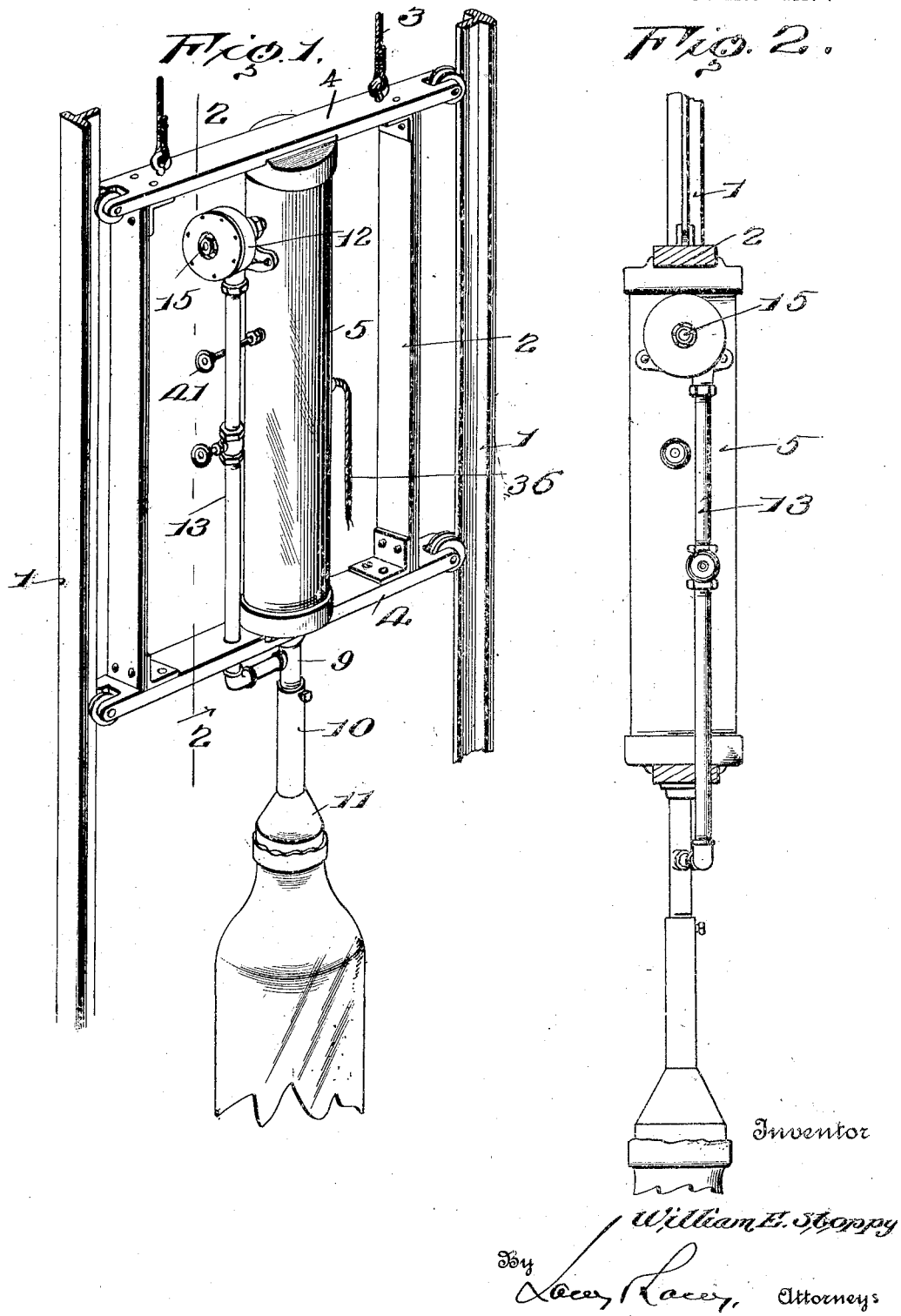

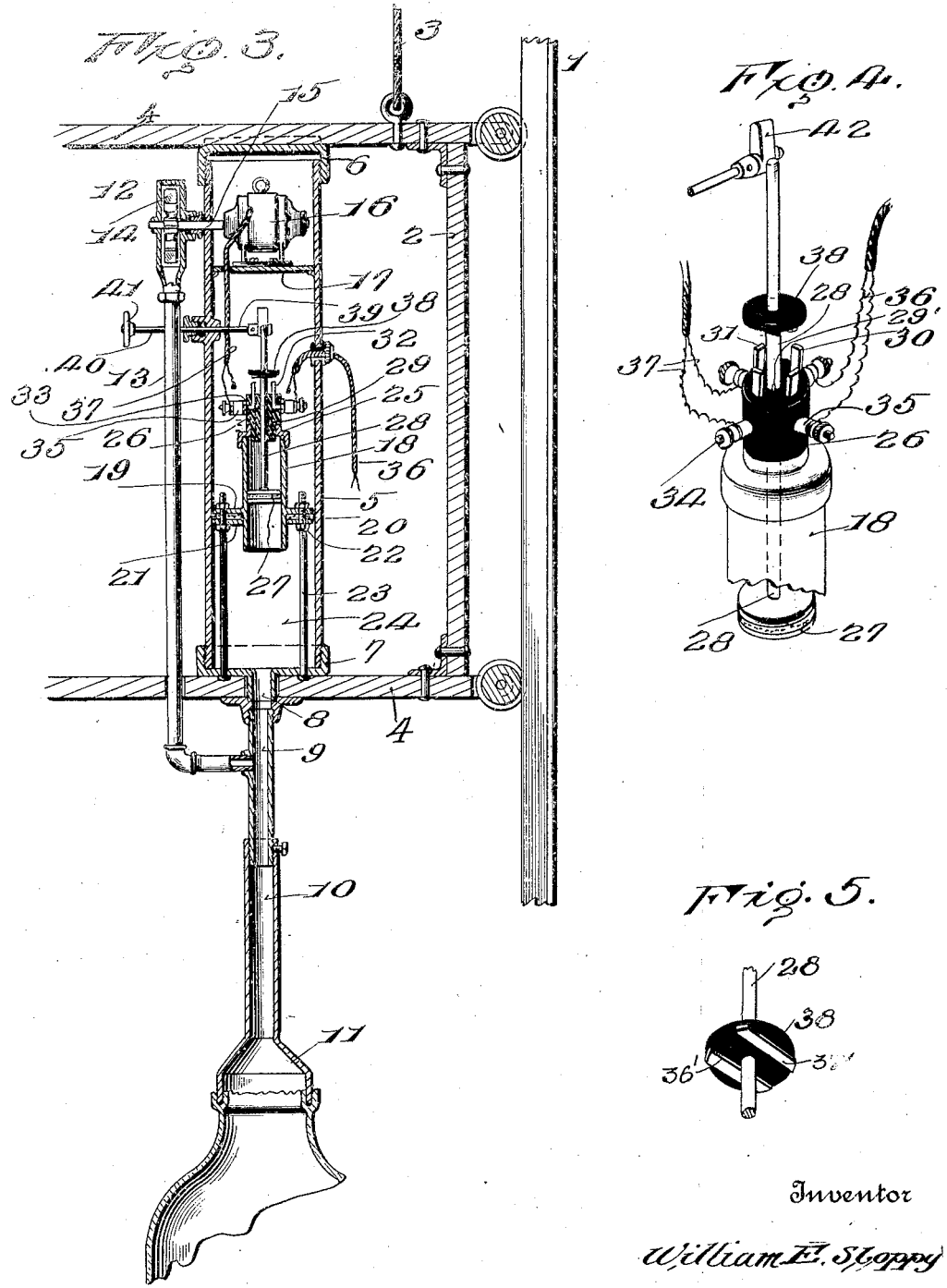

WILLIAM E. SLOPPY, OF MOUNT JEWETT, PENNSYLVANIA.

GLASS APPARATUS.

1,330,097.　　　　　Specification of Letters Patent.　　Patented Feb. 10, 1920.

Application filed May 21, 1918. Serial No. 235,848.

*To all whom it may concern:*

Be it known that I, WILLIAM E. SLOPPY, citizen of the United States, residing at Mount Jewett, in the county of McKean and State of Pennsylvania, have invented certain new and useful Improvements in Glass Apparatus, of which the following is a specification.

This invention relates to glass drawing apparatus and more particularly to that type of apparatus designed for drawing glass cylinders from which sheet glass is to be made. As is well known, in such apparatus, means is provided for supplying air through the bait and to the cap of the cylinder being drawn so as to suitably distend the cap until the desired circumference is reached whereupon during the continuance of the drawing operation, air is supplied in such a manner that the pressure within the cylinder being drawn will remain constant, the volume of air being, of course, gradually increased as the cylinder is drawn. The present invention, therefore, has as its primary object to provide novel means which will act automatically to supply air in increasing volume and under a constant pressure, during the drawing operation so that no attention is required upon the part of the operator for the purpose of regulating the air supply.

Another object of the invention is to provide means whereby the apparatus may be manually controlled at the beginning of the drawing operation and during the period in which the cap of the cylinder is to be formed so that any desired degree of pressure may be produced within the cap in causing expansion thereof to the desired diameter.

In the accompanying drawings:

Figure 1 is a perspective view of the apparatus embodying the present invention;

Fig. 2 is a vertical sectional view on the line 2—2 of Fig. 1;

Fig. 3 is a vertical transverse sectional view through the apparatus;

Fig. 4 is a perspective view illustrating the electrical contact devices, and the parts associated therewith;

Fig. 5 is a perspective view in detail of one of the contact elements.

In the drawings, the numeral 1 indicates spaced guide rails between which is guided, in its vertical travel, the usual drawing cage 2 suspended and adapted to be raised and lowered through the medium of cables or the like, indicated by the numeral 3. The cage 2 includes upper and lower cross beams 4 between which is mounted and suitably fixed a hollow cylinder or casing 5 closed at its upper and lower ends by means of suitable heads 6 and 7 respectively. The lower cylinder head 7 is provided with a nipple 8 which communicates with the upper end of an air conducting pipe 9. Fitted and secured to the lower end of this pipe is the tube 10 of the bait which latter is indicated by the numeral 11 it being understood that, as is usual in the operation of apparatus of this class, the cage 2 is to be lowered so that the bait 11 will dip into the molten glass, and then as the cage is slightly and gradually elevated, air is admitted through the pipe 9 and tube 10 and passing through the bait serves to expand the glass as it is drawn from the pot and until a cap of the desired circumference is obtained.

The numeral 12 indicates the casing of a rotary fan blower, and leading downwardly from this casing is an air conducting pipe 13 which communicates with the pipe 9, as clearly shown in Fig. 3 of the drawings. The blower fan is indicated by the numeral 14 and is mounted upon the shaft 15 of an electric motor indicated by the numeral 16. The motor 16 is supported upon a partition or bracket 17 fixed within the upper end portion of the cylinder 5 and it will be understood that when current is supplied to the motor, the fan 14 will be driven so as to force air under pressure through the pipe 13 for the purpose above stated.

The numeral 18 indicates a cylinder provided above its lower end with a circumscribing flange 19 against the under side of which is disposed a packing gasket 20. An annular plate 21 is disposed against the underside of the gasket, and nuts 22 are threaded on to tie rods 23 both above and below the flange 19 and plate 21 respectively, and when tightened serve to compress the packing gasket 20 so as to cause the edge of the gasket to snugly bind against the walls of the cylinder 5. In this manner an air-tight compartment or chamber 24 is provided within the lower portion of the cylinder 5. The tie rods 23 are secured or anchored at their lower ends to the head 7 of the said cylinder 5 and, of course, serve to support the partition formed by the flange 19, gasket 20, and plate 21 and prevent upward or downward displacement of the said partition. The cylinder 18 opens at its lower end into the chamber 24 and at its upper end has fitted to it a cap 25 supporting a bushing 26 of insulating material. The numeral 27 indicates the head of a piston which is slidably fitted within the cylinder 18 and is capable of free movement therein. The stem 28 of the piston extends upwardly from the head 27 and fits more or less loosely through a central opening or bore 29 formed in the insulating bushing 26. This bushing 26 supports a pair of contacts 30 and a pair of contacts 31. Each of the contacts comprises a contact arm 32 which is suitably embedded within the bushing 26 and, consequently, insulated from the other contacts, and which is provided at its lower end with an outwardly extending stem 33 which is threaded at its outer end as at 34 to provide for the application thereto of a binding post 35 serving for the connection of an electric conducting wire. Conductor wires 36 lead from any suitable source of current supply and are connected to the binding posts of the two contacts 30, and other conducting wires 37 are connected with the binding posts of the two contacts 31 and lead to the binding posts of the motor 16. The stem 28 of the piston extends upwardly between the pairs of contacts 30 and 31, and is held against rotation by a spline 29′, and the said stem has fitted or secured to it at a suitable point in its length, a head 38 carrying contact strips 36′ and 37′ which engage the corresponding contacts of the sets 30 and 31 when the piston is lowered. At such time, of course, current will be supplied to the motor, but when the piston is raised, the head 38 will be moved away from the elements 30 and 31 and current will cease to be supplied to the motor.

In order that the piston may be manually held in full lowered position regardless of air pressure within the chamber 24 and the cap of the cylinder being drawn, a shaft 39 is rotatably mounted as at 40 within the wall of the cylinder 5 and carries at its outer end a hand wheel 41 whereby it may be rotated. At its inner end the shaft 39 carries a finger 42 which may be caused to assume an upright position as shown in Figs. 3 and 4 of the drawings, in which position the stem of the piston may have free upward and downward movement, or by rotating the shaft 39 the finger 42 may be swung downwardly so as to bear against the upper end of said piston stem and thus hold it in full lowered position, as before stated.

When the drawing operation is begun, the hand wheel 41 will be turned so as to swing the finger 42 downwardly to exert pressure against the upper end of the piston. Thus the contact head will be held against the upper ends of the contact elements 30 and 31 and air compressed through rotation of the fan 14 will be forced under pressure through the pipe 13 and into the cylinder cap being formed, the cage 2 being gradually elevated during the formation of the cap. When the cap has reached the desired diameter, the hand wheel 41 is rotated so as to position the finger 42 upright as shown in Fig. 4, and the device will then operate automatically. Thereafter if the air pressure falls below the desired or proper degree, the piston head 27 will descend within the cylinder 18 and the head 38 will be brought into engagement with the upper ends of the contacts 30 and 31. The motor 16 will then function through flow of the motive fluid to operate the fan 14, and air under increased pressure will be supplied through the pipe 13 and the bait to the interior of the cylinder being drawn. On the other hand should the air pressure rise slightly above the normal or predetermined degree, the compressed air acting against the under side of the piston head 27 will cause the piston to move upwardly within the cylinder 18 carrying the head 38 away from the elements 30 and 31, and thus cut out the flow of motive fluid and the action of the motor and fan until the pressure again falls slightly below the normal or predetermined degree.

Having thus described the invention, what is claimed as new is:

1. In an apparatus of the class described, the combination with a movable frame and tube, an air compressor and motor therefor carried by the frame, and a pipe for supplying air from the compressor to the tube; of a cylinder in the frame communicating with said tube, a piston therein raised by increase of pressure, a stem rising from the piston, means for supplying motive fluid to said motor, a control for said means actuated automatically by the rise and fall of said stem, and a finger in the frame manually adjustable into the path of said stem to check the action of said control.

2. In a glass drawing apparatus, the combination with a movable cage and bait, a casing carried by the cage, an electric motor and an air compressor driven thereby and carried by the cage, and an air conducting pipe supplying air from the compressor to the bait; of a cylinder in communication with the conducting pipe, contacts on the cylinder in circuit with the motor and with a source of electricity, a piston working in the cylinder and includng a stem having a portion thereof projecting above the cylinder and carrying strips normally connecting said contacts but disengaged by the rise of the piston under increase of pressure, and a shaft journaled in the casing and having one end thereof provided with a handle and its other end provided with a finger adapted to engage the projecting end of the stem for holding said stem in lowered position and the circuit closed.

In testimony whereof I affix my signature.

WILLIAM E. SLOPPY. [L. S.]